Figure 1:
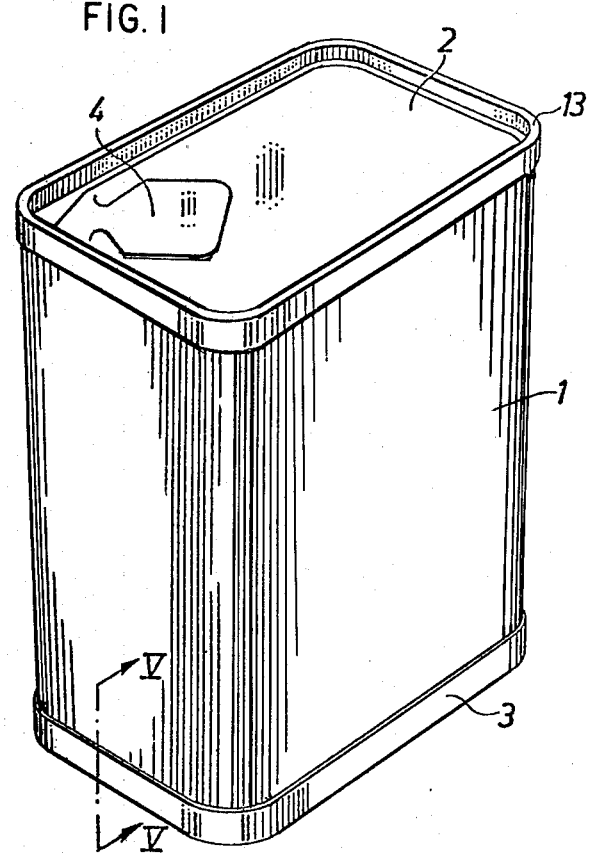
Figure 2A:
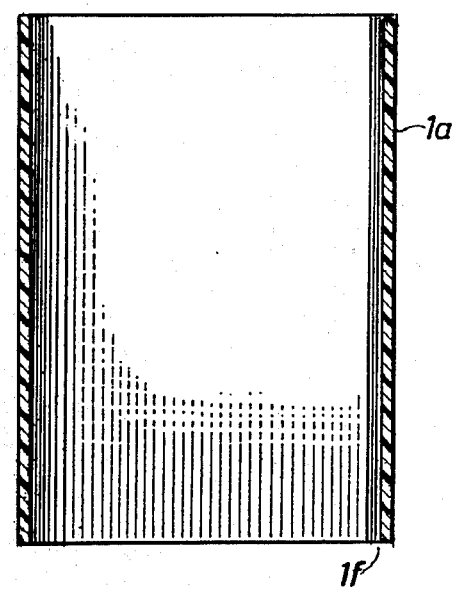
Figure 2B:
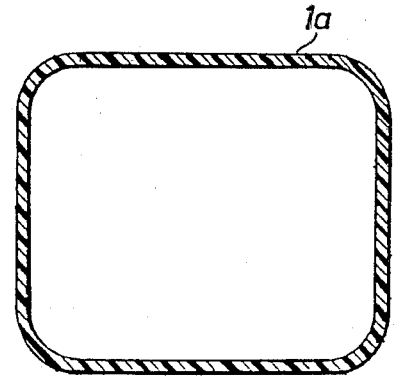
Figure 3:
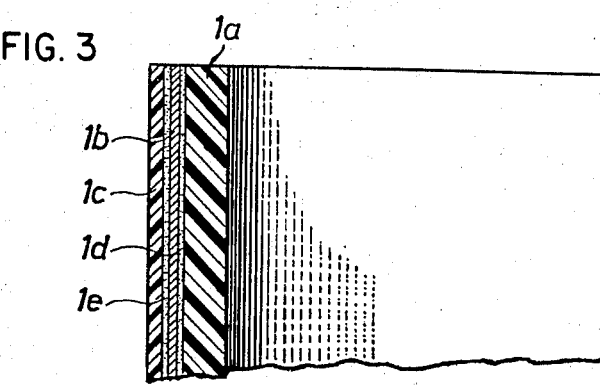
Figure 4A:
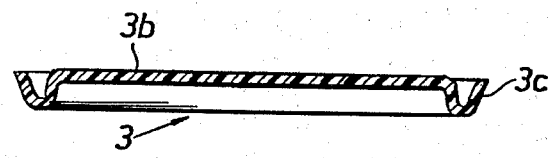
Figure 4B:
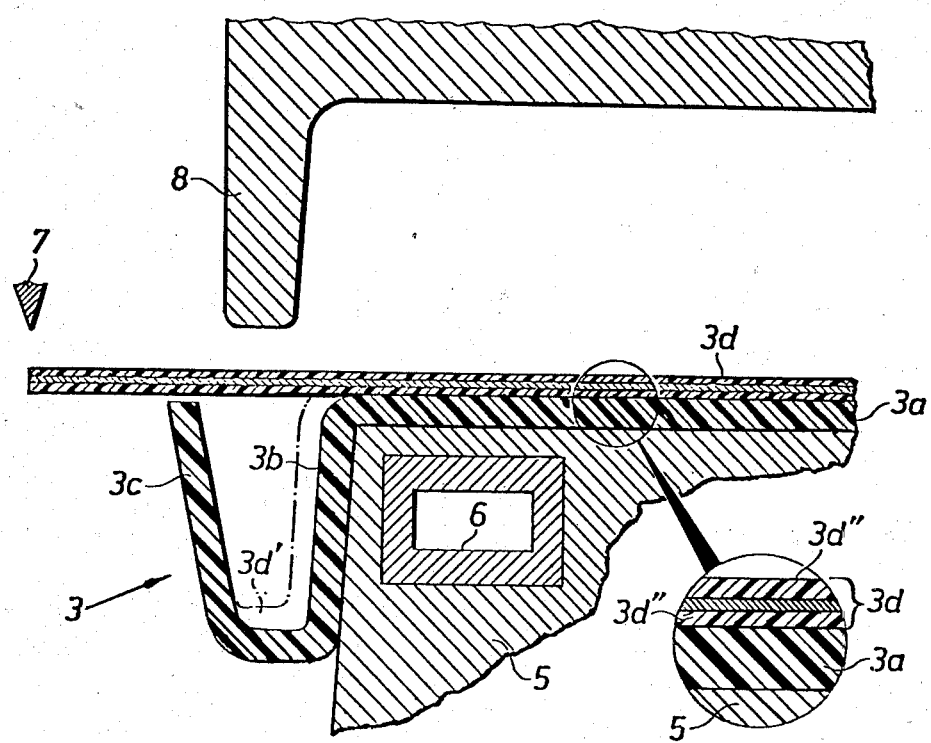
Figure 5:
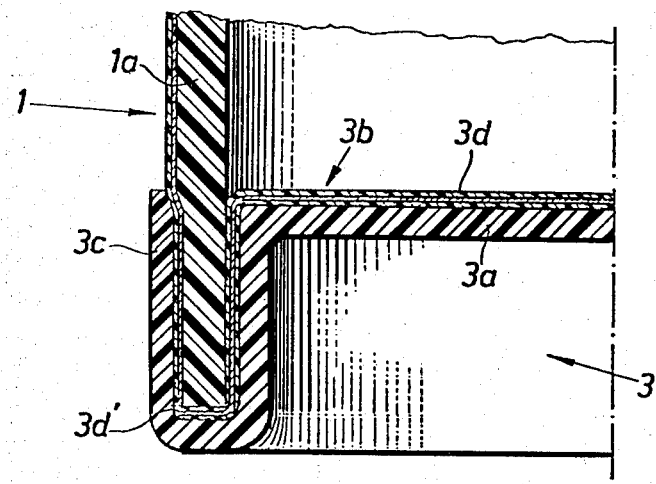
Figure 6:
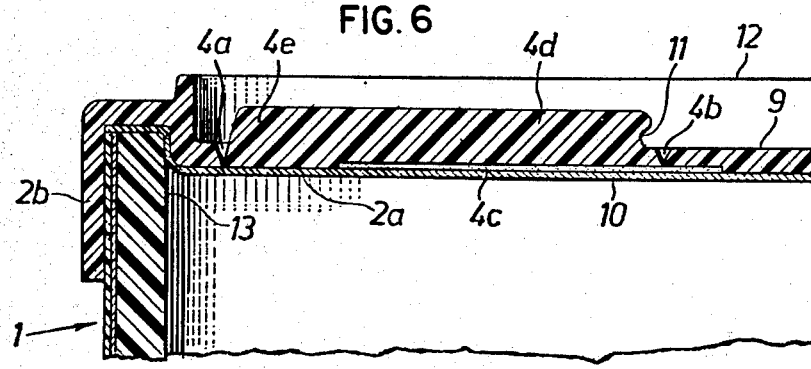
Figure 7:
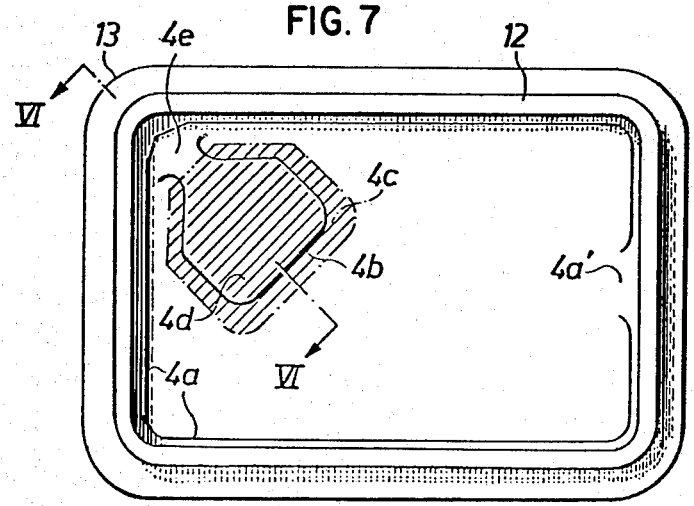
Figure 8:
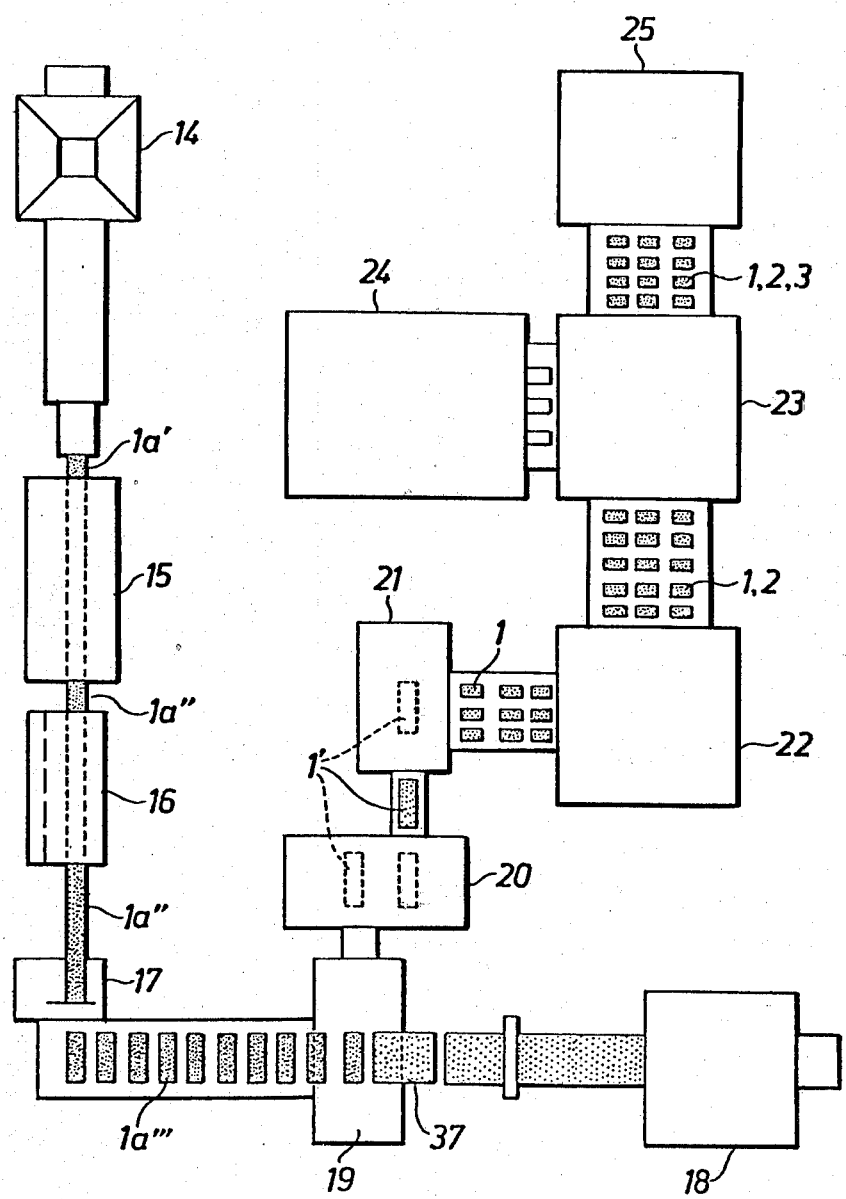
Figure 9:
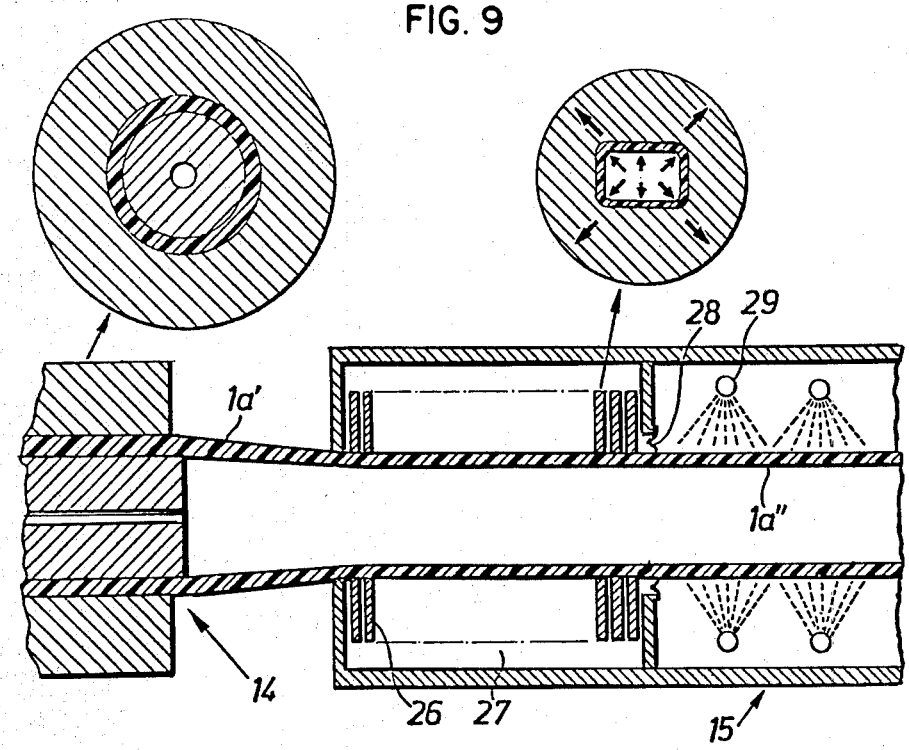
Figure 10:
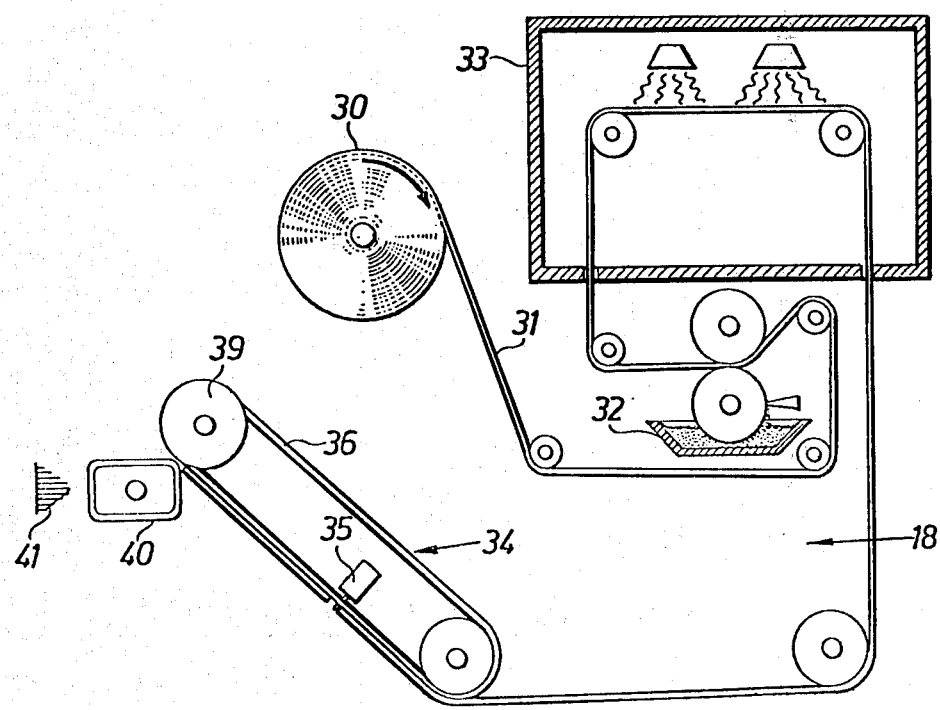
Figure 11A:
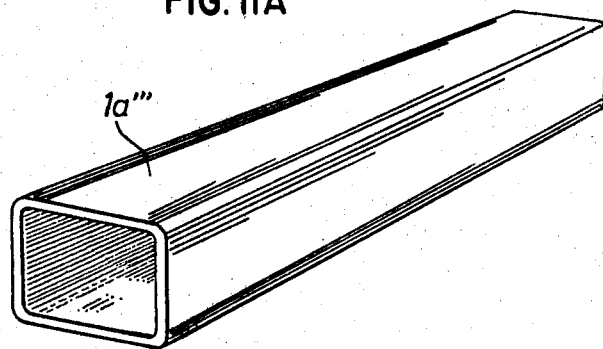
Figure 11B:
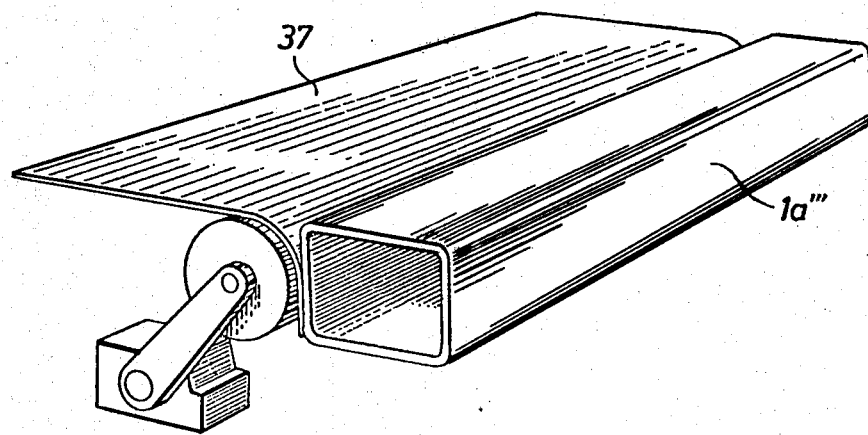
Figure 11C:
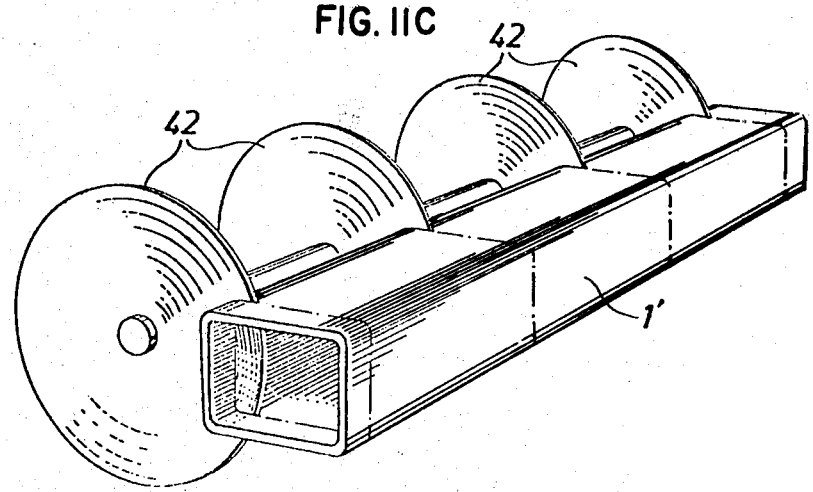
Figure 12:
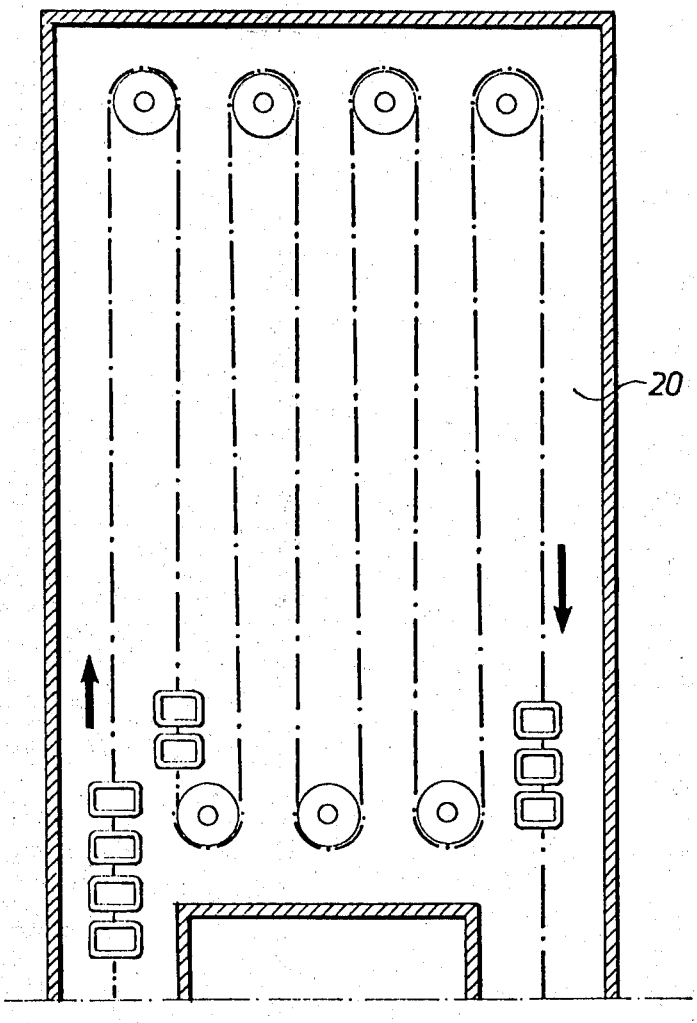
Figure 13:
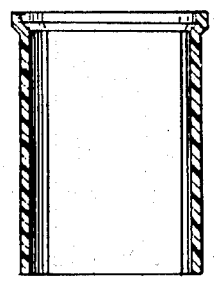
Figure 11A:
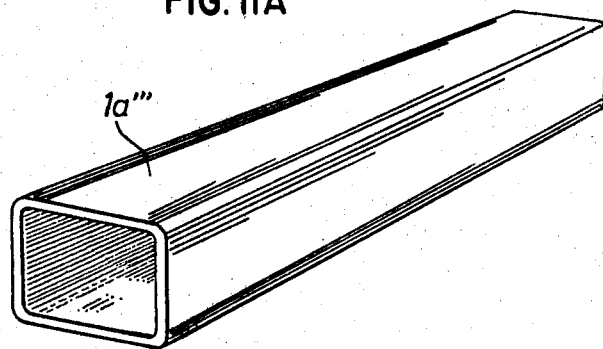
Figure 11B:
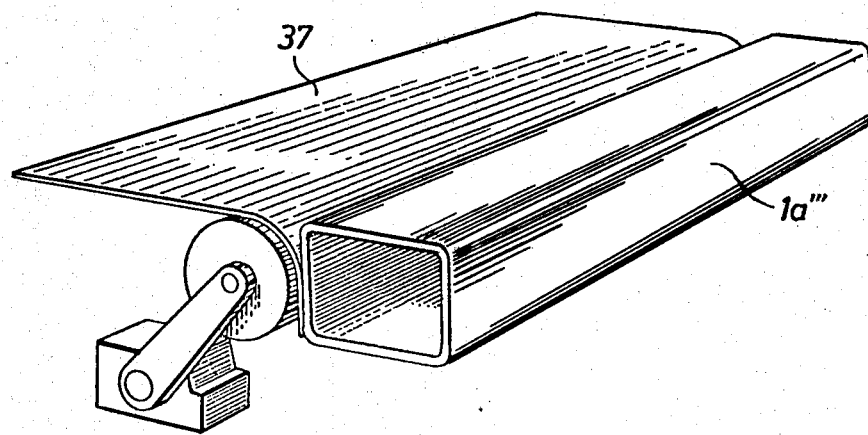
Figure 11C:
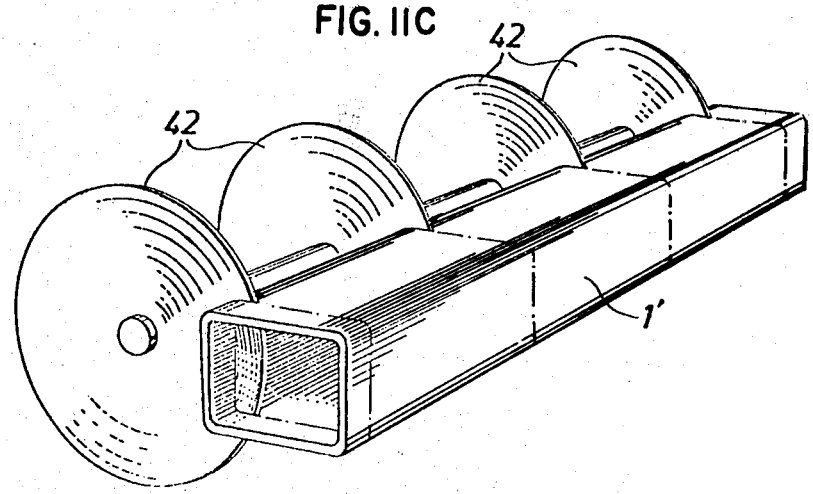

United States Patent [19]

Piltz et al.

[11] 4,267,937
[45] May 19, 1981

[54] TEAR OPENING DEVICE FOR CONTAINERS

[75] Inventors: Lars-Eric Piltz, Dalby; Bo T. Quist, Bjärred; Folke Kiellarson, Barsebäck; Siwer Mansson, Lund; Bengt Nilsson, Södra Sandby, all of Sweden

[73] Assignee: AB Akerlund & Rausing, Sweden

[21] Appl. No.: 25,792

[22] Filed: Apr. 2, 1979

Related U.S. Application Data

[62] Division of Ser. No. 721,866, Sep. 9, 1976.

[30] Foreign Application Priority Data

Sep. 12, 1975 [SE] Sweden ................................ 7510169
Sep. 12, 1975 [SE] Sweden ................................ 7510170

[51] Int. Cl.³ ........................ B65D 17/30; B65D 17/32
[52] U.S. Cl. .................................... 220/267; 215/256; 215/258; 220/269; 220/270
[58] Field of Search ............... 220/257, 258, 267, 269, 220/270; 229/47; 215/256, 258

[56] References Cited

U.S. PATENT DOCUMENTS

| 3,298,505 | 1/1967 | Stephenson | 206/45.31 |
| 3,301,432 | 1/1967 | Novak | 220/270 |
| 3,371,818 | 3/1968 | Bozek | 220/267 |
| 3,415,404 | 12/1968 | Robinson | 215/256 |
| 3,762,598 | 10/1973 | Goyner | 156/257 |
| 3,940,001 | 2/1976 | Haefner et al. | 215/1 C |
| 3,981,412 | 9/1976 | Asmus | 220/270 |
| 4,157,143 | 6/1979 | Dol | 215/254 |

FOREIGN PATENT DOCUMENTS

| 1319286 | 4/1961 | France . |
| 109896 | 10/1966 | Norway . |
| 308995 | 3/1969 | Sweden . |
| 945985 | 1/1964 | United Kingdom . |
| 998102 | 7/1965 | United Kingdom . |
| 1030407 | 5/1966 | United Kingdom . |

Primary Examiner—Stephen P. Garbe
Attorney, Agent, or Firm—Lerner, David, Littenberg & Samuel

[57] ABSTRACT

An opening device is taught for packages comprising a substantially rigid outer wall portion and an inner layer of substantially gas-tight material (preferably a metallic foil), wherein the outer wall portion includes a first tearing notch defining an opening and a second tearing notch defining a grip tongue. The outer wall and the inner wall being interconnected substantially over their total surfaces facing each other with said outer wall portion and said inner layer being separated within an area substantially under said grip tongue. Preferably, the grip tongue is located completely within the opening defined by said first tearing notch.

8 Claims, 16 Drawing Figures

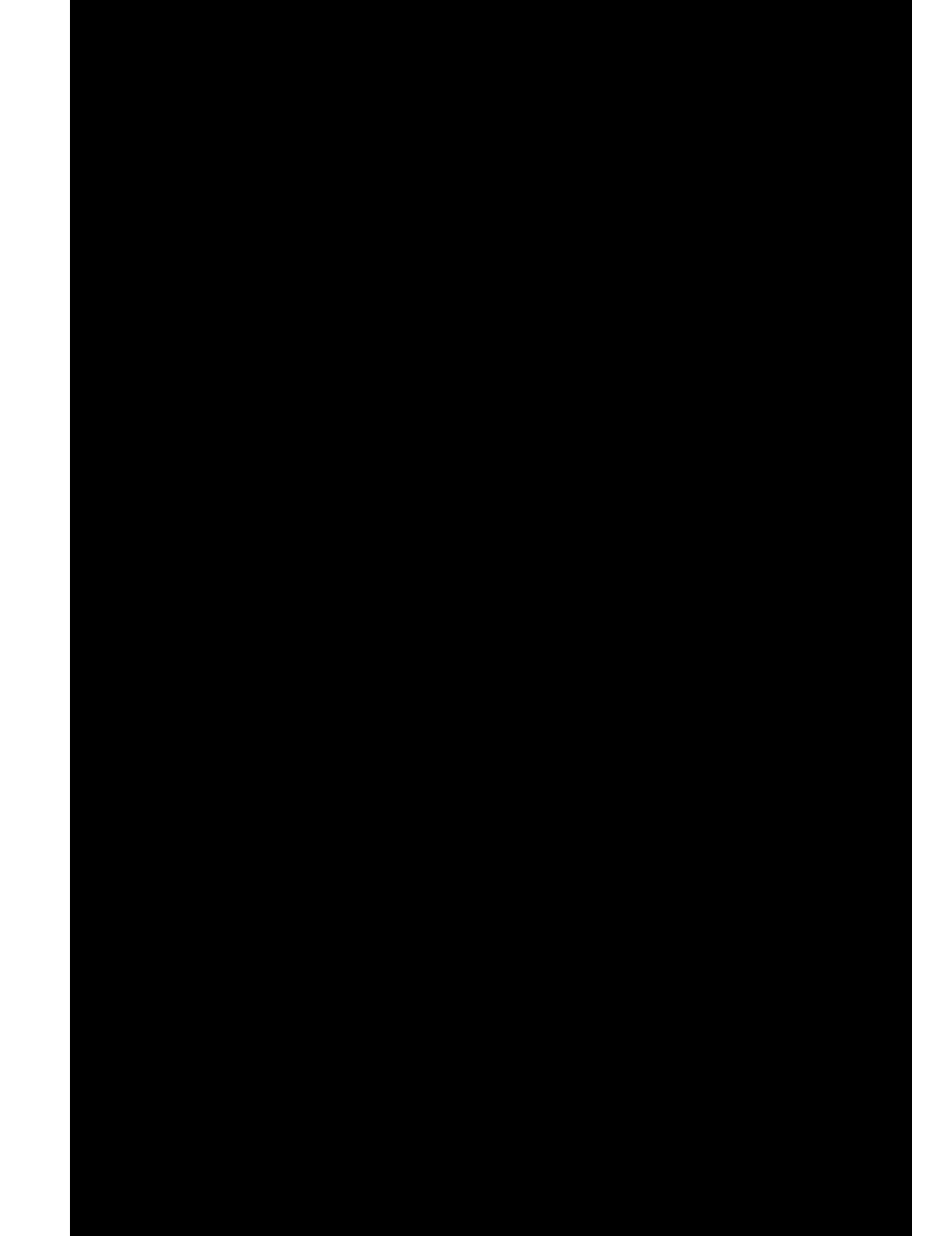

2. An opening device according to claim 1, wherein said grip tongue is located completely within said removable portion defined by said first tearing notch.

3. An opening device according to claim 2, wherein said grip tongue includes a prong portion having an edge at one end thereof which coincides with said first tearing notch, said edge being adapted to pierce said inner layer when the end of said grip tongue opposite said prong portion is raised from said inner layer.

4. An opening device according to claim 3, wherein said grip tongue is thicker than a surrounding portion of said outer wall portion.

5. An opening device according to claim 4, wherein said grip tongue includes a gripping edge adapted to be gripped by a fingernail of an operator.

6. An opening device according to claim 1, wherein said first tearing notch is formed in said cap, said first tearing notch extending completely through said cap.

7. An opening device according to claim 1, wherein said first tearing notch is formed in said cap, said first tearing notch including an interruption to facilitate the flow of injection molded plastic during the formation of said cap.

8. An opening device according to claim 1, wherein said polypropylene is an oriented polypropylene.

* * * * *